July 12, 1927.  1,635,484
E. G. KESLING
SPEED CHANGING MECHANISM FOR MOTOR VEHICLES
Filed Sept. 14, 1926   3 Sheets-Sheet 1
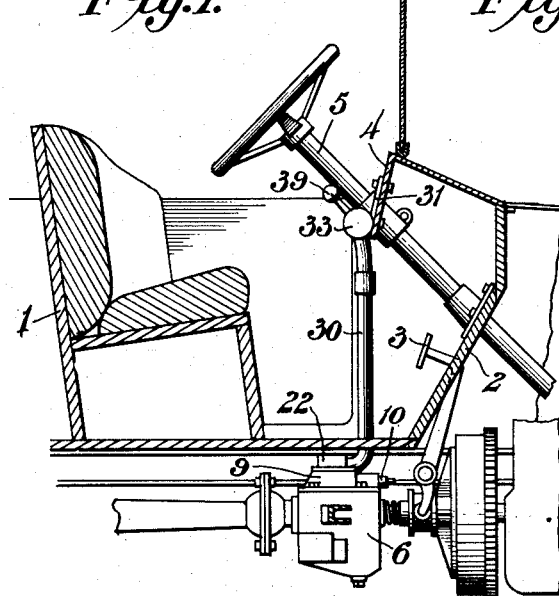
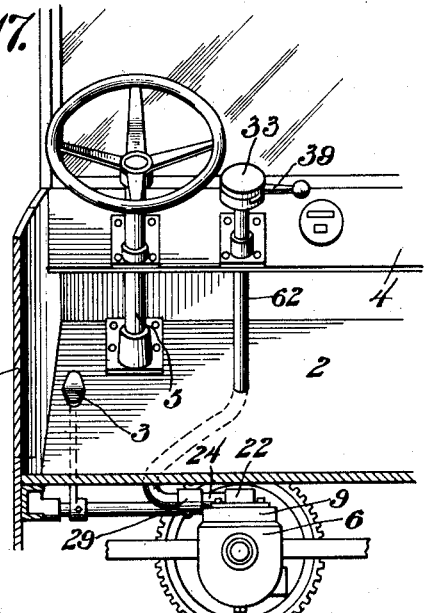
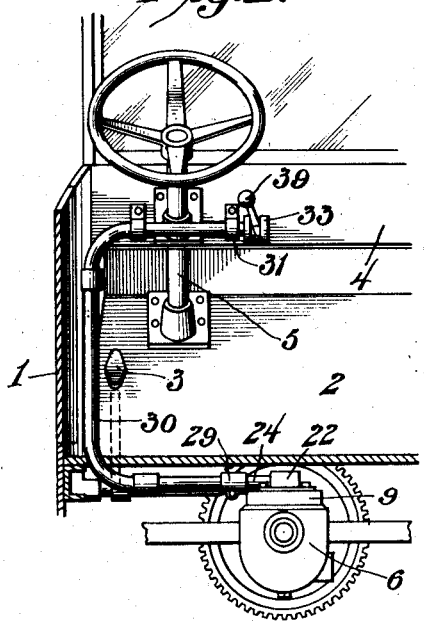
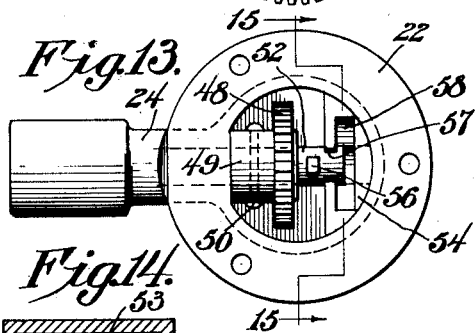
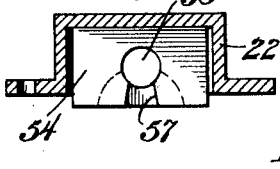
Witnesses
C. L. McDonald
E. N. Lovewell
Inventor
Elmer G. Kesling
By
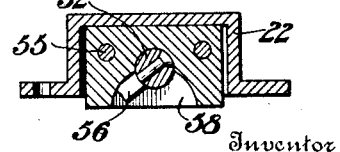
Attorney July 12, 1927.
E. G. KESLING
1,635,484
SPEED CHANGING MECHANISM FOR MOTOR VEHICLES
Filed Sept. 14, 1926   3 Sheets-Sheet 2
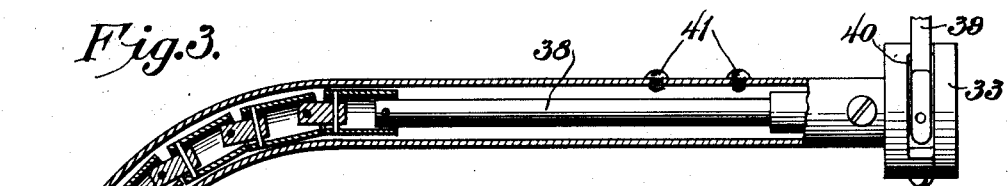
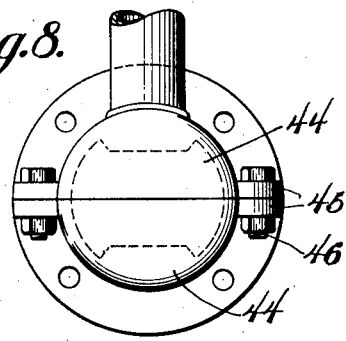
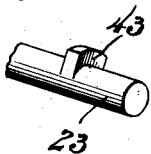
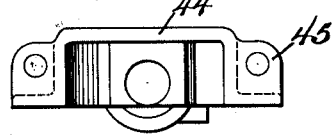
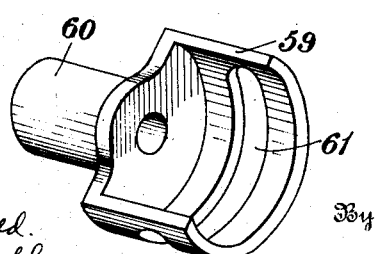
Inventor
Elmer G. Kesling
By
Attorney July 12, 1927.
E. G. KESLING
1,635,484
SPEED CHANGING MECHANISM FOR MOTOR VEHICLES
Filed Sept. 14, 1926    3 Sheets-Sheet 3
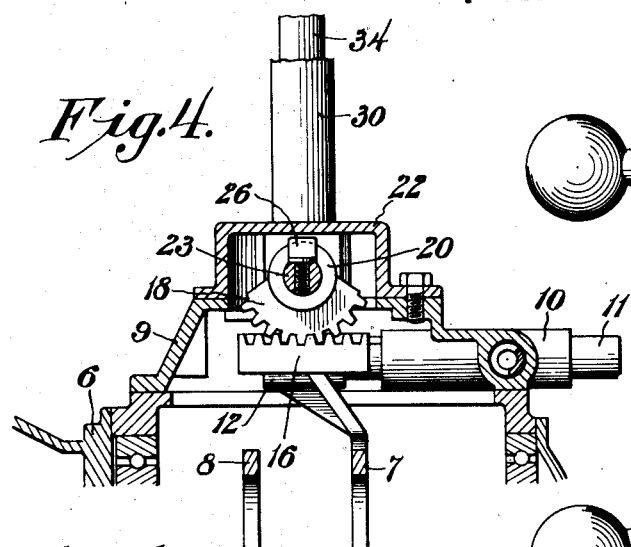
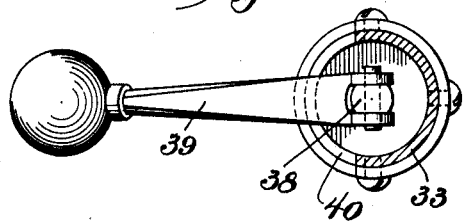
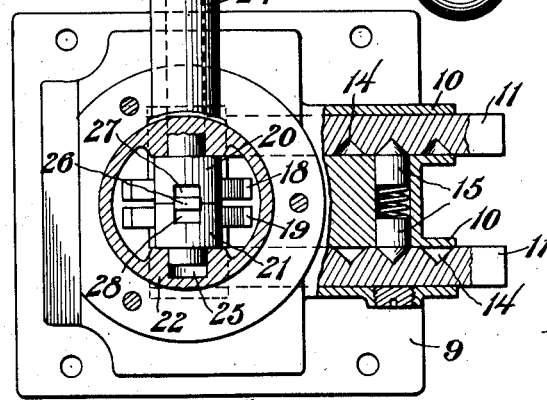
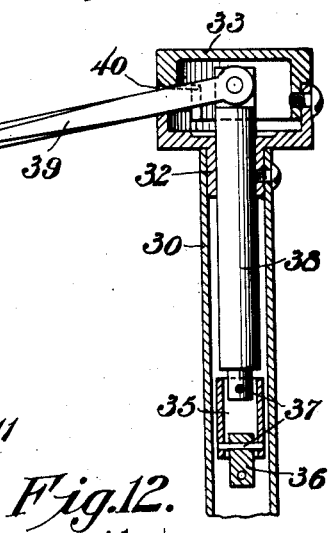
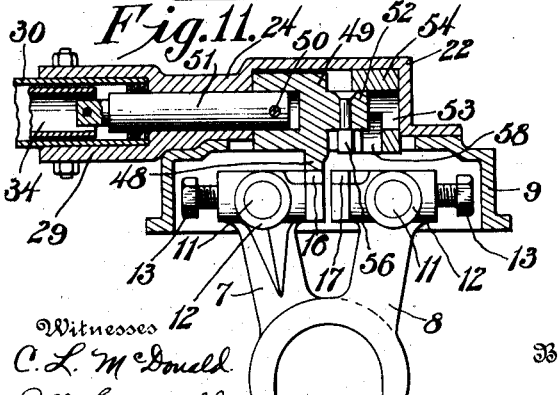
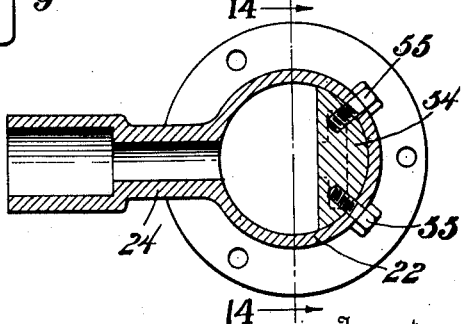
Witnesses
C. L. McDonald
E. N. Lovewell
Inventor
Elmer G. Kesling
Attorney Patented July 12, 1927.

1,635,484

UNITED STATES PATENT OFFICE.

ELMER G. KESLING, OF BLOOMFIELD, MISSOURI.

SPEED-CHANGING MECHANISM FOR MOTOR VEHICLES.

Application filed September 14, 1926. Serial No. 135,401.

This invention relates to speed changing mechanism particularly adapted for use on motor vehicles, and equally adaptable either to a gear shifting transmission mechanism, or to a transmission mechanism of the sliding key type in which the gears are always in mesh.

The primary object of the invention is to provide a practical gear shifting mechanism, which is so arranged that the floor board of the motor vehicle is left clear, and the actuating lever is located within easy reach of the driver and entirely out of the way of all the occupants of the vehicle.

It is also an object of the invention to provide mechanism which is easy to operate and positive in its action, and which is simple and durable in its construction, so that it is not liable to get out of working order or adjustment. The mechanism for transmitting power from the actuating lever to the shifting elements has no resilient parts, and is, therefore, substantially free from frictional rseistance and torsional displacement, such as results from the longitudinal or rotational movement of a resilien flexible shaft.

A further object is to provide a mechanism of this nature in which the gears, or other devices, may be shifted to or from any operative or intermediate position by the manipulation of a single actuating element, without previously selecting or setting some parts of the mechanism.

A still further object is to provide a mechanism in which a shorter actuating lever may be used to obtain the same leverage in shifting the gears as is the case when the common floor lever is employed.

The specific construction of the mechanism by which these advantages are obtained will be more fully explained in the following detailed description, taken in connection with the accompanying drawings illustrating the same.

In the drawings:

Figure 1 is a side elevation of the invention in operative position on an automobile, a portion of which is shown in section.

Figure 2 is a rear elevation of the invention showing the adjacent parts of the automobile in transverse section.

Figure 3 is a sectional view taken longitudinally of the tube through which the power is transmitted for shifting the gears.

Figure 4 is a section taken on the line 4—4 of Figure 3.

Figure 5 is a horizontal section taken through the parts shown in Figure 4.

Figure 6 is a sectional view of the box in which the actuating lever is mounted.

Figure 7 is a sectional view taken at right angles to the plane of Figure 6.

Figure 8 shows a modified form of housing for receiving the lower end of the jointed shaft.

Figure 9 is a side elevation of one section of the housing shown in Figure 8.

Figure 10 is a detail view of the end portion of the jointed shaft, as used in connection with the housing shown in Figures 8 and 9.

Figure 11 is a view similar to the lower part of Figure 3, but showing a modified form.

Figure 12 is a horizontal section through the housing shown in Figure 11.

Figure 13 is a bottom plan view of the housing and gear segment shown in the upper part of Figure 11.

Figure 14 is a section taken on the line 14—14 of Figure 12.

Figure 15 is a section taken on the line 15—15 of Figure 13, with the gear segment advanced to its innermost position.

Figure 16 is a detail perspective view of a modified form of the lever box shown in Figure 6.

Figure 17 is a view similar to Figure 2, but shows a modified arrangement.

The invention is illustrated in connection with an automobile body 1, provided with a foot board 2, through which the clutch pedal 3 extends, and a dash or panel 4 with the steering column 5 in the usual position. The invention is shown as applied to the usual type of slidable gear transmission located within a transmission housing 6, and provided with the customary shifting yokes 7 and 8.

The transmission housing 6 is provided with a cover 9 formed with two spaced sleeves 10, in which bars 11 are slidably mounted. Each of the yokes 7 and 8 is formed with a supporting collar 12, which is secured to one of the bars 11 by a set screw 13, or other suitable means. Each of the bars 11 is formed with three recesses 14, corresponding to neutral and two operative positions, and spring-pressed plungers 11

15 cooperate with the respective recesses to retain the respective bars 11, and the gears actuated thereby, in the position to which they have been shifted.

The yokes 7 and 8 are provided on their upper faces with racks 16 and 17 respectively, and in the form illustrated in Figure 1 to 5 inclusive, these racks are always engaged by the respective toothed segments 18 and 19. The hubs 20 and 21 of these segments are mounted within a cap or housing 22 secured to the cover 9. A spindle 23 is slidably and rotatably mounted in a bearing 24 formed by an extension of the cap 22, and the end of this spindle is received by a socket 25 formed in the cap. The spindle 23 forms a bearing for the hubs 20 and 21 of the toothed segments. A pin 26 is secured in the spindle 23, and by longitudinal movement of the spindle may be brought into engagement with either one of the notches 27 and 28 formed in the adjacent faces of the respective hubs. Thus, it will be seen that the toothed segments are held against longitudinal movement with the spindle 23, but one segment or the other rotates with the spindle, depending upon whether the pin 26 engages the notch 27, or the notch 28.

The outer end of the bearing 24 is enlarged, and formed with a split socket 29 for receiving and clamping the end of a tube or pipe 30, which may be made in any shape desired, and preferably extends upwardly adjacent the side of the body 1, and then inwardly above the dash, as shown in Figures 1 and 2. As shown in Figure 2, the upper portion of the tube 30 is secured in brackets 31, and secured within the end of the tube is the neck portion 32 of a box 33.

The spindle 23 constitutes the lower end portion of a jointed shaft, which is made up of rigid elements pivotally connected one to the other within the tube 30. These elements include comparatively long sleeves 34 disposed within the straight portions of the tube, and comparatively short sleeves 35, alternating with solid links 36, to which they are connected by transverse pivot pins 37, arranged successively at right angles to each other after the manner of a gimbal joint. The sleeves fit somewhat loosely over the ends of the links, so that they have a universal movement with respect to one another, and when the shaft is rotated there is practically no lost motion between them. Moreover, the jointed shaft may be moved endwise, or rotated by actuating means located at one end, with practically none of the friction, and none of the torsional resistance which is experienced when a flexible resilient shaft or wire is used.

A spindle 38 constitutes the upper end portion of the jointed shaft, and is slidably and rotatably mounted in the neck 32 of the box 33, and extends into the latter where it has an actuating lever 39 pivotally connected thereto. This lever extends through a circumferential slot 40 in the box 33, whereby it may be moved to rock the spindle 38 and the jointed shaft, and the edges of the slot 40 are beveled sufficiently to permit the lever to be rocked thereon as a fulcrum to shift the shaft longitudinally.

In order to facilitate the movement of the jointed shaft within the tube 30, and prevent the same from rattling, the tube is preferably filled with heavy oil, or other lubricant. To this end, the upper portion of the tube is provided with two openings adapted to receive set screws 41, which may be removed for the purpose of filling the tube with lubricant. The lower end of the tube is provided with a packing gland 42 to prevent leakage of the lubricant.

In the modification shown in Figures 8 9 and 10, the spindle 23 is formed with an integral lug 43 in place of the pin 26, and in order to permit the assemblage of the same, the housing or cap, which receives the spindle, is made in two sections 44, each provided with ears 45, which are secured by bolts 46.

In the modification shown in Figures 11 to 15 inclusive, a single toothed segment 48 is used in place of the two segments 18 and 19, this segment being movable with the longitudinal movement of the jointed shaft, so as to engage either one of the racks 16, 17 prior to the shifting of the gears. In order to guide the segment 48 in this movement, it is formed with a hub 49, which is secured by a pin 50 to a spindle 51, the latter being somewhat shorter than the spindle 23. The hub 49 is formed with a reduced extension 52, which is guided in a socket 53 formed in a block 54, which is suitably secured within the cap 22 by screws 55 or the like. The extension 52 carries a finger 56, which is adapted to pass longitudinally through a slot 57 in the block 54, and when it has entered the block 54, to move laterally to either end of the cross slot 58.

In the modification shown in Figure 16, the lever box 59 is open, instead of being a complete two-piece box like that shown at 33, in Figures 6 and 7. The box 59, however, is provided with a neck 60, which may be secured to the end of the tube 30, and with a slot 61 for guiding the actuating lever 39.

In the modification shown in Figure 17, the tube 62, which encloses the jointed shaft, extends from the panel 4 downwardly and forwardly out of the way of the feet of persons sitting in the front seat, and extends thence rearwardly and laterally into the housing 22.

From the foregoing description, it will be seen that I have provided convenient and practical means, whereby the selection and shifting of the gears may be effected directly from a lever mounted above the instrument panel, or in any other position conveniently accessible to the driver, while the floor of the automobile may be left entirely free from obstruction. The hand lever may be as short as desired, and by using sectors 18 and 19, or a sector 48, of suitable radius, any desired leverage may be obtained in shifting the gears. The same H motion, and the same feel of the shift is had as with the usual shifting lever now in use. The longitudinal or rotary motion of the spindle 38 is reproduced in the spindle 23 through the medium of the jointed shaft guided within the tube, and the endwise and rotational movement of the jointed shaft is free from any appreciable frictional resistance or twisting, or torsional movement such as invariably occurs when a resilient flexible shaft is used.

While I have shown and described in detail the specific details of the invention as at present preferred, it is obvious that various other modifications may be made in the structure and arrangement thereof without any material departure from the salient features of the invention as set forth in the claims.

What is claimed is:

1. A device of the character described comprising a rockable and longitudinally slidable spindle, gear shifting mechanism having a pin and slot connection with said spindle, a shaft made up of a series of elements composed of rigid material and connected in end to end relation by pivot pins arranged transversely thereof and transversely to each other, one end of said shaft being connected to said spindle, a second spindle connected to the other end of the shaft, actuating means for selectively rocking said second spindle or moving it longitudinally, and a rigid curved tube in which said shaft is guided, so as to positively transmit the movement of the second spindle to the first-mentioned spindle.

2. A device of the character described comprising a rockable and longitudinally slidable spindle, gear shifting mechanism having a pin and slot connection with said spindle, a shaft made up of a series of elements composed of rigid material and connected in end to end relation by pivot pins arranged transversely thereof and transversely to each other, one end of said shaft being connected to said spindle, a second spindle connected to the other end of the shaft, an actuating lever pivotally connected to said second spindle for rocking the same or moving it longitudinally, a rigid curved tube in which said shaft is guided so as to positively transmit the movement of said second spindle to the first-mentioned spindle, and a box secured to and supported by said tube and having a slot in which said lever is guided.

3. A device of the character described comprising a rockable and longitudinally slidable spindle, gear shifting mechanism having a pin and slot connection with said spindle, a shaft made up of a series of elements composed of rigid material and connected in end to end relation by pivot pins arranged transversely thereof and transversely to each other, one end of said shaft being connected to said spindle, a second spindle connected to the other end of the shaft, a rigid curved tube in which said shaft is guided so as to positively transmit the movement of said second spindle to the first-mentioned spindle, a box secured to and supported by the end of the tube adjacent the second spindle, an actuating lever pivotally connected within the box to the second spindle to swing about an axis transverse thereto, said box having a circumferential slot through which the lever passes, and in which it is guided when moved to rock the shaft, the edge of the slot constituting a fulcrum for the lever when the latter is swung in a direction to move the shaft longitudinally.

4. A device of the character described comprising a spindle, a bearing member in which the spindle is mounted for longitudinal and rocking movement, a jointed shaft connected at one end to said spindle, a second spindle connected to the other end of the shaft, actuating means for rocking said second spindle or moving it longitudinally, a rigid curved tube in which said shaft is guided so as to positively transmit the movement of said second spindle to the first mentioned spindle, said bearing being formed with a socket in which the adjacent end of the tube is secured, and packing between the spindle and the wall of the tube, so that the latter may be kept filled with lubricant.

5. A gear selecting and shifting mechanism comprising a plurality of yokes formed with longitudinal racks, a plurality of coaxial toothed segments in constant mesh with the respective racks, there being one segment for each rack, a spindle, and means for moving said spindle selectively into engagement with any one of the segments and for rocking said spindle and segment, so engaged, to shift the yoke connected therewith.

6. A gear selecting and shifting mechanism comprising a plurality of yokes formed with longitudinal racks, a transversely disposed spindle guided for slidable and rocking movement, toothed segments supported on the spindle, there being one segment in mesh with each rack, means holding the segments against movement with the spindle when the latter is moved longitudinally, and means secured to the spindle and selectively engageable with either segment by the longitudinal movement of the spindle, so as to cause said segment to be actuated by the spindle when the latter is rocked.

7. A gear selecting and shifting mechanism comprising a plurality of yokes formed with longitudinal racks, a plurality of coaxial toothed segments in constant mesh with the respective racks, there being one segment for each rack, a spindle selectively slidable into engagement with any one of the segments and rockable when so engaged to shift the selected yoke, a second spindle located at a distance from the first-mentioned spindle, means for selectively rocking said second spindle and for moving it longitudinally, and means for positively transmitting the motion of the second spindle to the first-mentioned spindle.

8. A gear selecting and shifting mechanism comprising a plurality of yokes formed with longitudinal racks, a transversely disposed spindle guided for slidable and rocking movement, toothed segments supported on the spindle, there being one segment in mesh with each rack, means holding the segment against movement with the spindle when the latter is moved longitudinally, a jointed shaft having one end connected to said spindle, a tube in which the shaft is guided, an actuating lever pivotally connected to the other end of the shaft, and a box housing said other end of the shaft and having a slot in which said lever is guided.

9. A gear selecting and shifting mechanism comprising a plurality of yokes formed with longitudinal racks, a transversely disposed spindle guided for slidable and rocking movement, toothed segments supported on the spindle, there being one segment in mesh with each rack, means holding the segments against movement with the spindle when the latter is moved longitudinally, a jointed shaft connected at one end to said spindle, a second spindle connected to the other end of the shaft, actuating means for selectively rocking said second spindle or moving it longitudinally, and a rigid curved tube in which said shaft is guided so as to positively transmit the movement of said second spindle to the first-mentioned spindle.

10. A gear selecting and shifting mechanism comprising a plurality of yokes formed with longitudinal racks, a transversely disposed spindle guided for slidable and rocking movement, toothed segments supported on the spindle, there being one segment in mesh with each rack, means holding the segments against movement with the spindle when the latter is moved longitudinally, a jointed shaft connected at one end to said spindle, a second spindle connected to the other end of the shaft, an actuating lever pivotally connected to said second spindle for rocking the same or moving it longitudinally, a rigid curved tube in which said shaft is guided so as to positively transmit the movement of said second spindle to the first-mentioned spindle, and a box secured to and supported by said tube and having a slot in which said lever is guided.

11. A gear selecting and shifting mechanism comprising a plurality of yokes formed with longitudinal racks, a transversely disposed spindle guided for slidable and rocking movement, toothed segments supported on the spindle, there being one segment in mesh with each rack, means holding the segments against movement with the spindle when the latter is moved longitudinally, a jointed shaft connected at one end to said spindle, a second spindle connected to the other end of the shaft, a rigid curved tube in which said shaft is guided so as to positively transmit the movement of said second spindle to the first-mentioned spindle, a box secured to and supported by the end of the tube adjacent the second spindle, an actuating lever pivotally connected within the box to the second spindle to swing about an axis transverse thereto, said box having a circumferential slot through which the lever passes and in which it is guided when moved to rock the shaft, the edge of the slot constituting a fulcrum for the lever when the latter is swung in a direction to move the shaft longitudinally.

12. A gear shifting and selecting mechanism, comprising a rockable and longitudinally slidable spindle, a jointed shaft made up of elements composed of rigid material, one end of said shaft being connected to said spindle, a second spindle connected to the other end of the shaft, actuating means for selectively rocking said second spindle or moving it longitudinally, and a rigid curved tube in which said shaft is guided so as to positively transmit the movement of the second spindle to the first-mentioned spindle.

13. A gear selecting and shifting mechanism, comprising a plurality of yokes formed with longitudinally racks, a plurality of coaxial toothed segments in constant mesh with the respective racks, there being one segment for each rack, a spindle mounted for slidable and rotatable movement, means associated with the spindle for selectively engaging any one of the segments to cause the same to rock with the spindle and to shift the yoke connected therewith.

14. A gear selecting and shifting mechanism, comprising a plurality of yokes formed with longitudinal racks, a plurality of coaxial toothed segments in constant mesh with the respective racks, there being one segment for each rack, each segment having a slot, a slidable and rockable spindle associated with said segments and having a projection thereon which is selectively engageable by a longitudinal movement of the spindle with the slot in any one of the segments to cause said segment to rock with the spindle and shift the yoke connected therewith.

15. A gear selecting and shifting mechanism comprising a plurality of yokes formed longitudinal racks, a plurality of toothed segments, there being one segment in mesh with each rack, a spindle on which the segments are supported, said spindle being guided for sliding and rocking movement, means restricting the segments to rocking movement only, each segment having a slot, and a projection on said spindle selectively engageable by a longitudinal movement of the spindle with the slot in any one of the segments to cause said segment to rock with the spindle and shift the yoke connected therewith.

In testimony that I claim the foregoing as my own, I have hereto affixed my signature.

ELMER G. KESLING.